United States Patent [19]
Osborne

[11] Patent Number: 5,682,553
[45] Date of Patent: Oct. 28, 1997

[54] HOST COMPUTER AND NETWORK INTERFACE USING A TWO-DIMENSIONAL PER-APPLICATION LIST OF APPLICATION LEVEL FREE BUFFERS

[75] Inventor: Randy B. Osborne, Cambridge, Mass.

[73] Assignee: Mitsubishi Electric Information Technology Center America, Inc., Cambridge, Mass.

[21] Appl. No.: 422,344

[22] Filed: Apr. 14, 1995

[51] Int. Cl.[6] .................................................. G06F 12/02
[52] U.S. Cl. .................. 395/876; 370/473; 395/250; 395/497.01; 395/497.02
[58] Field of Search .................... 370/60, 94.1, 95.1, 370/473; 395/250, 309, 497.01, 497.02, 876

[56] References Cited

U.S. PATENT DOCUMENTS

| | | | |
|---|---|---|---|
| 5,367,643 | 11/1994 | Chang et al. | 395/309 |
| 5,426,639 | 6/1995 | Follett et al. | 370/94.1 |
| 5,432,908 | 7/1995 | Heddes et al. | 395/474 |
| 5,434,976 | 7/1995 | Tan et al. | 395/200.07 |

Primary Examiner—Kenneth S. Kim
Attorney, Agent, or Firm—Robert K. Tendler

[57] ABSTRACT

A network interface using per-application free buffer lists includes a packet processor which processes an incoming message and stores packet data into free buffers designated for the application for which the message intended. The packet processor has memory storing an internal free buffer list. The internal free buffer list is loaded from an external free buffer list memory, which contains a free buffer list for each application. Each time a message arrives for a given application, the packet processor retrieves a portion of the external free buffer list for the application and loads the portion into the internal free buffer list. The portion which is loaded is a number of free buffers which is thought to be sufficient to handle an anticipated size of the incoming message. As a packet is processed, data are deposited in the buffers specified in the internal list. Any internal buffers unused after the packet is processed are attached to the end of the list of filled buffers returned, providing a self-cleaning property that allows an application to exert some control over which buffer an incoming packet uses. If packet data remains after the internal free buffer list is used up, the packet processor retrieves another portion of the external free buffer list and continues processing the message. To facilitate reading only a portion of the external free buffer list, the list may be organized as a two-dimensional structure, such as a linked list of free buffer lists.

20 Claims, 5 Drawing Sheets

HOST COMPUTER AND NETWORK INTERFACE USING A TWO-DIMENSIONAL PER-APPLICATION LIST OF APPLICATION LEVEL FREE BUFFERS

FIELD OF THE INVENTION

This invention is related to network interfaces for computer systems. More particularly, the invention is related to the management of lists of free buffers in which a network interface deposits data received in packets from other computers.

BACKGROUND OF THE INVENTION

In networked computer systems, a computer is typically connected to a network via a network interface to communicate with other computers. In order to receive data packets, a computer needs free buffer area, i.e., empty memory locations, into which data can be stored. A computer commonly has a single queue of free buffers that are shared among all established communication channels, henceforth called a global free buffer queue or list. To ensure non-interference, i.e., protection, between applications using different communication channels, either multiple applications of one user or across multiple users, the global free buffer queue is managed by a trusted entity. Usually this trusted entity is the operating system and the global free buffer queue is allocated from memory space dedicated to the operating system.

The operation of the operating system to manage the global free buffer queue is as follows. First, when a packet arrives, a buffer is removed from the global free buffer list and is filled with the packet data. If additional buffers are required for the packet data, then, in turn, a buffer is removed from the global free buffer queue, filled with data, and then linked to the previous filled buffers for that packet. After an indication, via polling, blocking or interrupt to an application, that data is available, the application makes an operating system call that causes the data to be transferred to the application space using one of two methods. In the first method, the operating system copies the data to a location in the application space specified by the application. In the second method, the operating system maps the memory pages containing the buffers into the application space at a location specified by the application. The buffers are commonly arranged to be equal to and aligned with the memory page size in order to make such mapping efficient. It is also possible that the application sets up a receive handler that the operating system invokes to transfer a completed receive packet to the application. An operating system call is also required here to convey the address to which to transfer the data. Both of these methods incur the cost of an operating system call, which is expensive, although the overhead for such a call though can be easily amortized for large data transfers. The first method incurs a high cost for copying data, but has the advantage that data can be placed in application space exactly where the application wants it. The second method directly incurs only the cost of manipulating the memory mapping tables and perhaps a few consequent memory translation misses; however, the memory pages containing the buffers cannot be used for any application data other than the buffers, which indirectly restricts placing data exactly where the application may want it.

Because the global buffer queue is shared among multiple communication channels, it is not possible to know in advance which packets will be assigned to which buffers. Thus, there is no way for the application to control the locations to which the data is really transferred. This lack of control means that it is not possible for packet data to be directly stored onto a memory page that is occupied by some application data structure. Consequently, the data may need to be copied. This method is oriented towards bulk data delivery where the application is assumed to process large blocks of data. Through the cost of operating system calls, both methods impose a high relative overhead in processing time for small messages, precluding applications with low latency messaging requirements. Both methods also impose the cost of copying, directly in the first method and indirectly in the second method, because the application may want the data on a memory page mixed with other application structures.

SUMMARY OF THE INVENTION

The invention overcomes these problems with the prior art by providing a network interface which uses external per-channel free buffer lists and corresponding internal per-channel free buffer lists which are loaded for each incoming packet by accessing a portion of the external list according to an anticipated size of an incoming packet. The term "per-channel free buffer list" signifies that buffers are allocated to a particular established communication channel, which permits each buffer to be effectively in application space since no other channel can write to the buffer. This arrangement reduces the communication latency. Also, by suitably controlling the buffers in the per-channel free buffer list, data can be placed in specified locations in the application space. Furthermore, the only involvement is an operating system call to add free buffers to the per-channel free buffer queue. A network interface may support both global and per-channel free buffer queues so that an application can choose the method based on its communication requirements.

A network interface in one embodiment of the invention includes a packet processor which processes an incoming packet and transmits data from cells in the packet into free buffers for a designated channel. The packet processor has a memory for storing an internal free buffer list for each communication channel. The internal free buffer list is loaded from an external free buffer list memory, which contains a larger free buffer list for each communication channel. Each time a packet arrives for a given channel, the packet processor retrieves a portion of the external free buffer list for the channel and loads the portion into the internal free buffer list for that channel. As packet data arrives, the packet data is deposited in the buffers in the internal list. If buffers remain after a packet is processed, they are discarded. If packet data remains after the internal free buffer list is used up, the packet processor retrieves another portion of the external free buffer list and continues processing the packet. If no more buffers remain in the external free buffer list, an interrupt is generated to request more free buffers. The interrupt may be directed to an operating system or another application program. The external free buffer list may be organized as a two-dimensional structure, such as a linked list of free buffer lists. By providing application program control, on a per-channel basis, of the external free buffer list for a channel, the application program can control where data is deposited. For example, the application program can identify contiguous portions of memory, of arbitrary size, as free buffers in the external buffer list. An interrupt code may also be provided in the external buffer list to force interrupts to occur prior to when the external buffer list is emptied. Using this invention, the network interface more readily allows packet data to be deposited in application level memory without interaction with the host operating system.

The invention is relevant for network interfaces for all types of packet-based communication. One particular type of packet-based communication is asynchronous transfer mode (ATM) communication, a connection-based communication paradigm, meaning that an explicit connection is established for each communication channel. In an ATM communication system basic unit is fixed size cell, 53 bytes in size with 48 bytes of data payload. Packets are segmented at the sender into cells, transmitted through the network as cells, and then reassembled into packets at the receiver.

BRIEF DESCRIPTION OF THE DRAWING

These and other features of the subject invention will be better understood in connection with the Detailed Description taken in conjunction with the Drawing in which.

DETAILED DESCRIPTION

Figure 1:
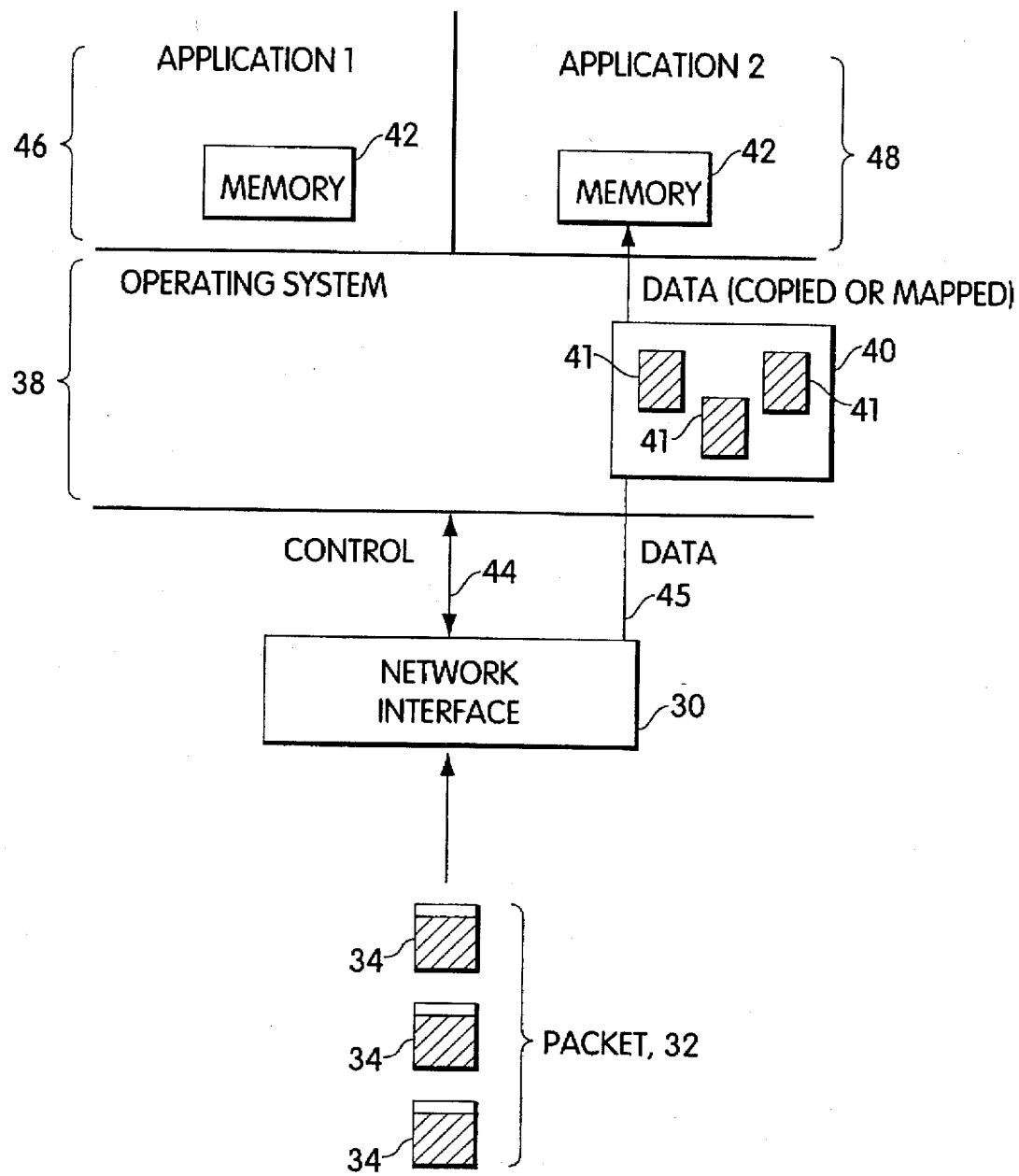
FIG. 1 shows a conventional network interface for processing incoming packets for multiple connections using global free buffer lists.

Referring now to FIG. 1, a typical asynchronous transfer mode (ATM) communication system has a network interface 30 through which packets 32 are received. Packets are generally comprised of a plurality of cells 34. Generally, the network interface 30 is connected to a host processor (not shown) which operates under the control of an operating system 38 which has associated host memory 40, which includes buffers 41. Other applications, such as applications 46 and 48 which use the host processor have their own associated application level memory 42. The network interface 30 communicates with the operating system 38 via control line 44 and transfers data over line 45.

As described above and generally speaking, in a system such as shown in FIG. 1 the network interface 30 interrupts the host processor and operating system 38 via control line 44 upon receipt of a packet 34. The network interface copies the data from each cell into free buffers in the host memory 40. The data is then copied, or its location is mapped, into locations in the application level memory 42, where the application is indicated by the header information in the cell 34.

Figure 2:
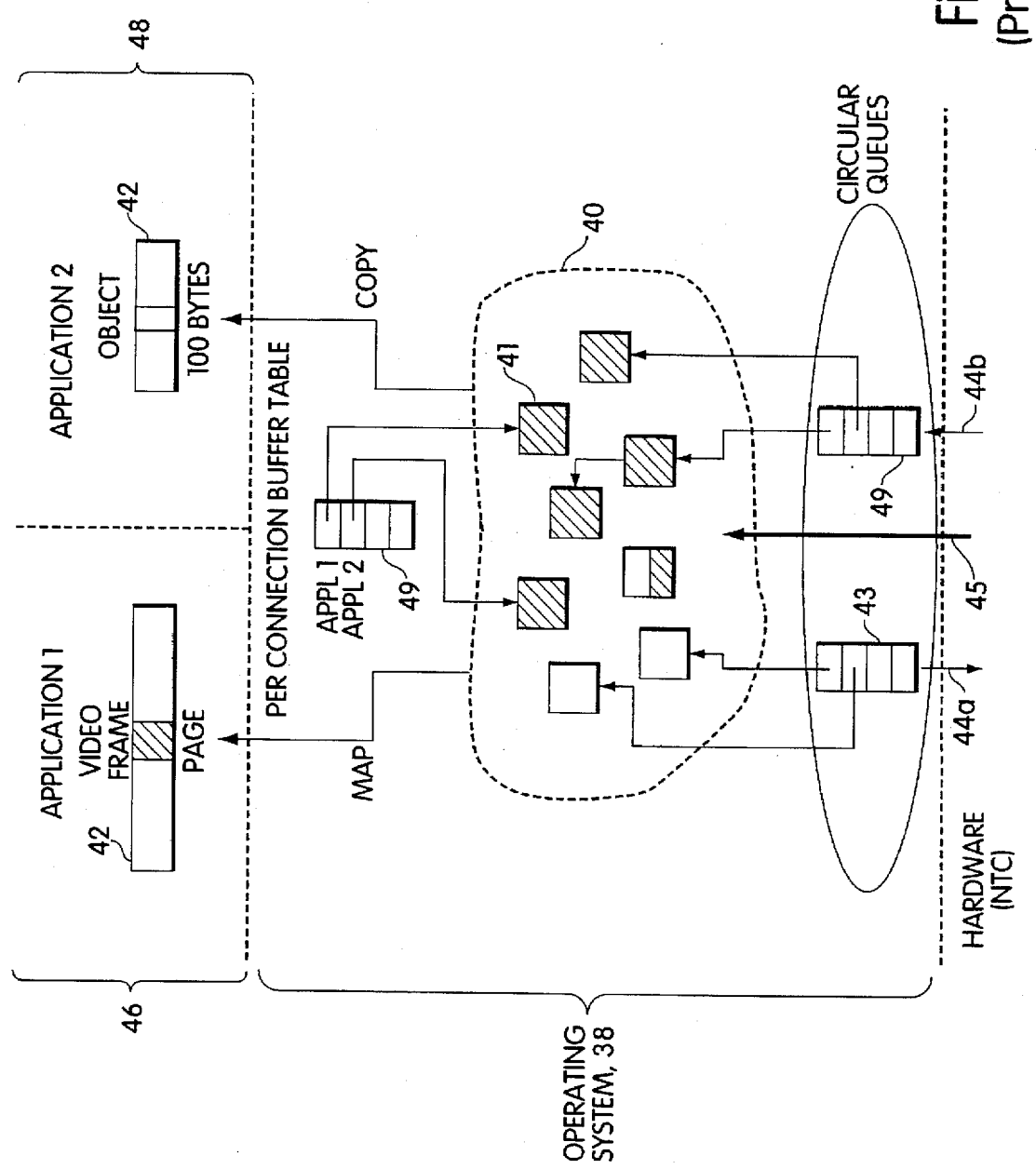
FIG. 2 illustrates FIG. 1 in more detail.

This conventional system is shown in more detail in FIG. 2. In particular, the operating system maintains a free buffer list 43, a full buffer list 49 and a per connection full buffer table 47. The free buffer list 43 is a queue of the free buffers available in the buffer pool 40. When a packet is received, a pointer to the next free buffer is retrieved, using line 44a and data is written to the buffer. The pointer to the buffer is written to the full buffer list 49 using line 44b. The per connection full buffer table indicates all the full buffers used for a particular application. When an application does a read, it retrieves the pointer to the next full buffer in the per connection buffer table 47 and copies or maps the data in the buffer to the application level memory 42.

Figure 3:
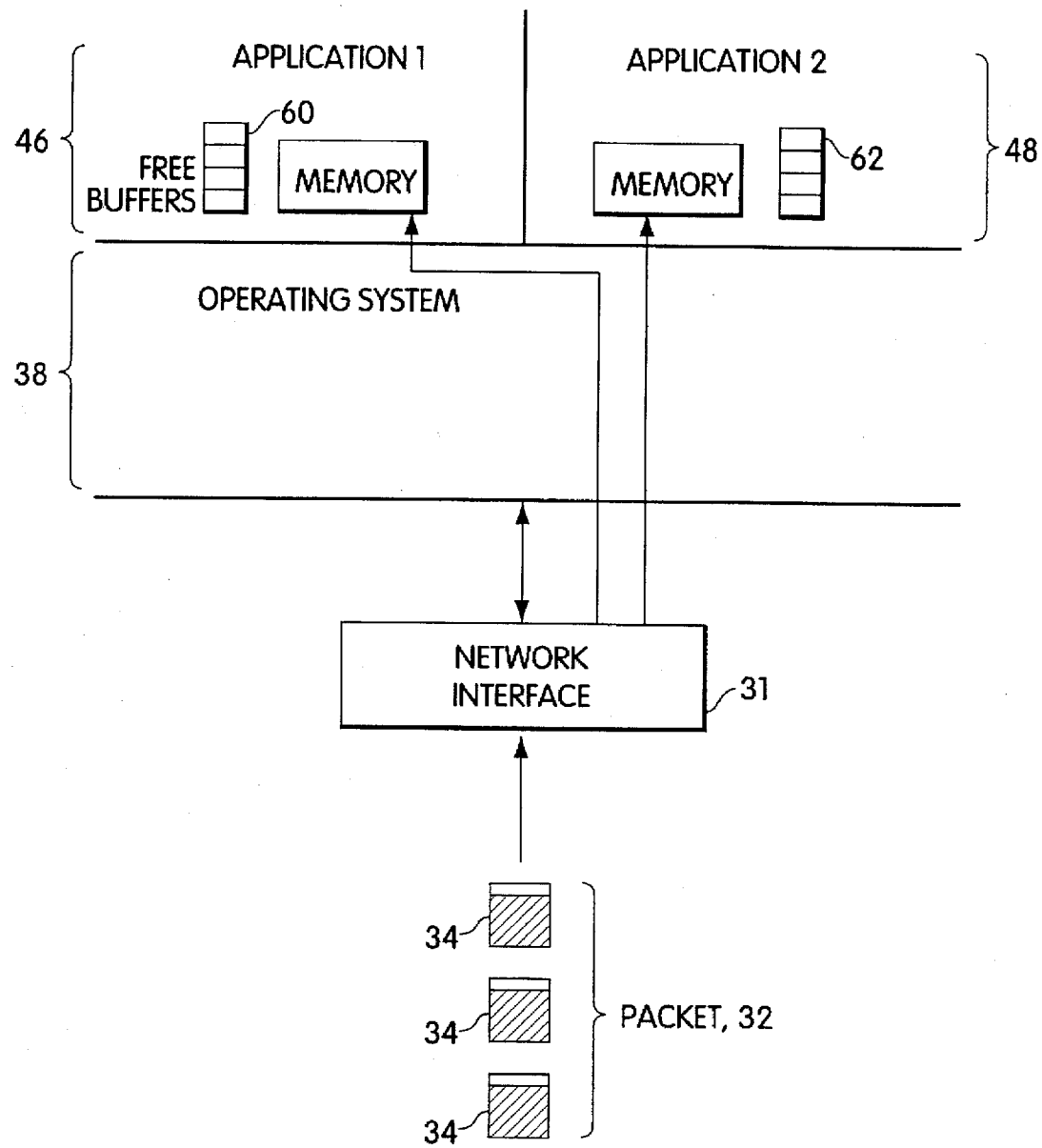
FIG. 3 illustrates a system in accordance with the present invention.

In contrast, referring now to FIG. 3, in the invention a list of indications of free buffers is provided for each channel. Upon receipt of a packet, a packet from the list is selected and data is deposited into this buffer, without copying to operating system level buffers. In particular, each application 46,48 has its own respective free buffer list 60,62, which may be stored in the application level memory, the operating system or in the network interface. The network interface identifies, for each packet, a next buffer in which to deposit data from a received packet. In this manner, data is not copied to operating system buffers. Also, the application may control the free buffers into which data will be deposited, allowing the application more control over data organization in the buffer. For example, the buffers need not correspond to memory page sizes and may be as small or as large as desired. Additionally, an application may identify a series of contiguous buffers.

Figure 4:
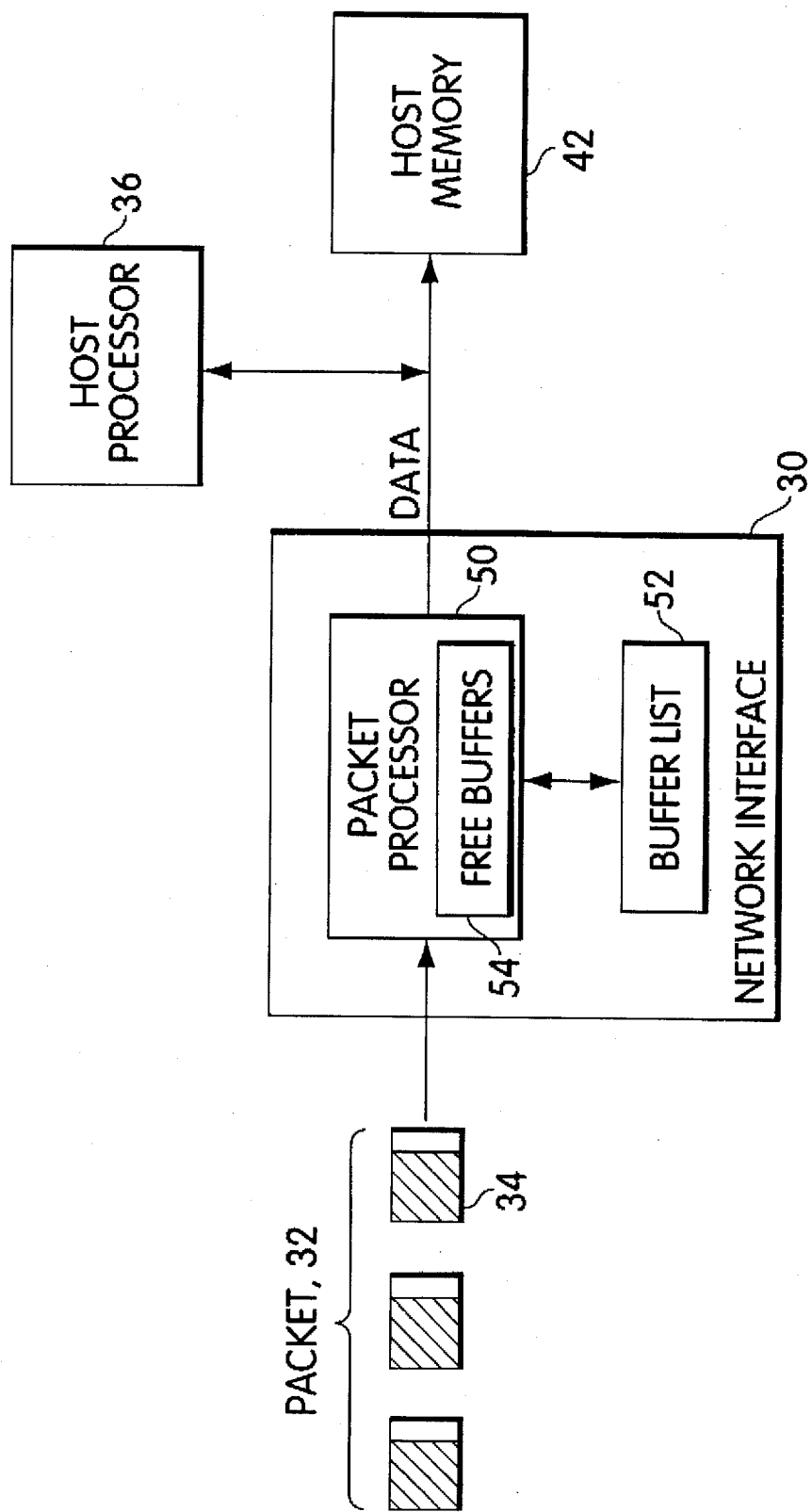
FIG. 4 illustrates the network interface of FIG. 3 in more detail.

FIG. 4 illustrates a network interface in accordance with the invention. The network interface includes a packet processor 50 and a buffer list 52. The packet processor 50 includes a table of free buffers 54 which, for each connection, lists all free buffer locations assigned to that connection. This table is internal when the packet processor is a single integrated circuit. Incoming messages for a given connection, rather than being routed to the operating system memory, are copied directly to a location found in a free buffer list for that connection in the application level memory 42. If no free buffers are found, an interrupt is generated and the application or operating system generates a new list of free buffers available and adds them into buffer list 52.

Upon receipt of a packet 32 by the packet processor 50, the network interface ensures that indications of free buffers are loaded internally. It also may generate an interrupt. If they are not already loaded, the indications of free buffers are loaded from an external list. If the external list is empty, the network interface generates an interrupt for service. As a packet is being processed, buffers are filled with packet data until the end of the packet is received or until the buffers in the loaded list are exhausted. In the latter case, more buffers are loaded into the network interface and an interrupt is generated if none are available. When the network interface has finished processing a packet, the application is typically signaled, perhaps using an interrupt.

There are a number of different ways to implement the buffer list and the use of buffers by the packet processor 50.

A first way to use the buffer list involves copying, upon receipt of a packet, the entire buffer list into the internal free buffer table 54. When processing of the packet is complete for a given connection the unused portion of the buffer list is discarded. One problem with this solution is that a large number of free buffers may be discarded and a new list needs to be generated, involving processing time by a local processor or host processor.

A second method also copies the entire buffer list into the internal free buffer table 54. However, when processing of the packet is complete, the unused portions of the buffer list are not discarded, but are saved in the internal list. One problem with this method is that it is not self-cleaning, meaning that a local or host processor has to manage removal of any buffers left over from the previous packet. Such removal may be necessary if the next packet is to be stored in a specified buffer distinct from those used by the previous packet. Since the size of an incoming packet is not generally known in advance, such cleaning up after a packet may always be necessary in this second method. Not only is such cleaning in the critical path, impairing performance, but the packet processor must be designed to handle such cleaning.

Both of these solutions have difficulty in providing the capability to send a sequence of packets in contiguous chunks to an application-level memory. That is, if a second packet must be stored in a sequential buffer location after a first packet, these two solutions may not be able to provide such a capability.

Although the size of an incoming packet may not be known in advance, it can often be bounded and the buffer capacity in the list of free buffers can be set to such a bound. Thus, the main difficulty is with the left over buffers reflecting the difference between the bound and the actual packet size. Occasionally, the bound may be difficult to determine. In this case, some limit can be set and, when the limit is exceeded by an attempt to load a new list of free buffers, the next list of free buffers can be used, or, if that list is unsuitable or non-existent, an interrupt can be generated to have a local or host processor attend to identifying more free buffers. These insights provide the basis of a third method.

Figure 5:
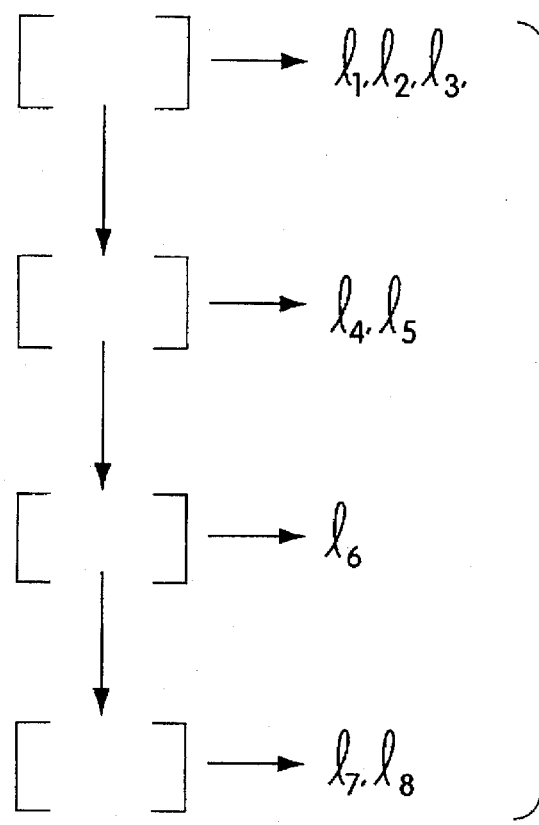
FIG. 5 illustrates a preferred structure of an external per channel free buffer list.

The third method which provides more control over the buffer list will now be described in connection with FIG. 5. In this embodiment, only a portion of the external buffer list is read into the internal free buffer table. The number of buffers read is selected according to an anticipated size of an incoming packet. To provide for this capability, in one embodiment of the invention, the buffer list is two-dimensional and can be considered as a linked list of linked lists. That is, a free buffer list is generated and broken into a number of lists. Each list has a length corresponding to the number of buffers to be read. For example, each indication of a free buffer may have one reserved field or other field that can be used as a pointer to any next free buffer, and another field to provide a link to any next list of free buffers. The packet processor 50 stores the memory location of any next buffer list for each connection upon receipt of a packet 32. If the pointer stored is null, an interrupt is generated to cause a list of free buffers to be generated. The buffer list is then retrieved along with a pointer to the next buffer list which is stored in a temporary register. Alternatively, the next pointer may be a constant offset from the first pointer and may be merely calculated. The next buffer list is only retrieved when the first buffer list is extinguished. The first buffer list may be retained in memory and discarded upon receipt of any subsequent packed or discarded when processing of a packet is complete.

One advantage of this scheme is that a local or host processor may handle most of the complexity of managing the buffer lists. That is, most of the burden is in software. However, use of a two-dimensional buffer list yields the flexibility to do either of the first and second methods noted above. There is a potential conflict in adding new free buffer lists to the external free buffer: the packet processor could be modifying the list at the same moment the local processor is modifying the list. To resolve this conflict, per channel hold and unhold operations may be used. Before modigying the list, a processor "holds" that channel and then "unholds" the channel after completing the modifications. Adequate buffering must be provided to prevent the loss of data arriving when the channel is in a "hold." Alteratively, the processor can first check the number of free buffer lists available and only perform the "hold" and "unhold" if the list of free buffer lists contains only one or two free buffer lists. With more than this number of free buffer lists available, the processor can add a new free buffer list to the end of the external list before it is consumed by the packet processor.

Figure 6:
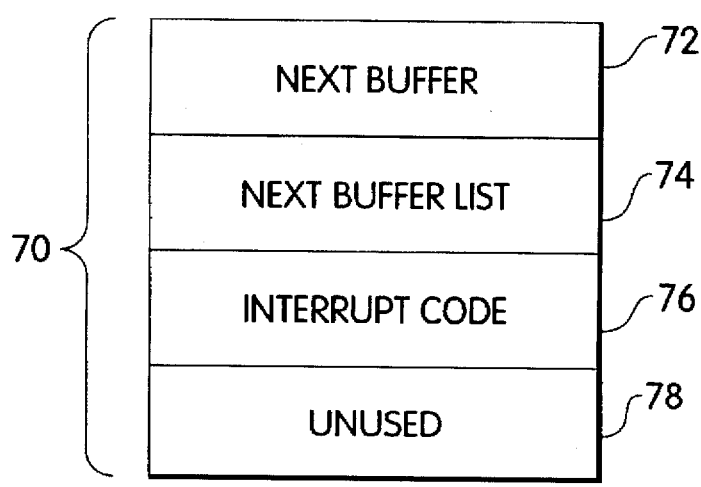
FIG. 6 illustrates an implementation of a linked list data structure including an interrupt code.

The control of interrupts to generate a new free buffer list will now be described in FIG. 6. Generally speaking, an interrupt can be generated when no more free buffer lists are available. Additionally, in the last free buffer list, the pointer to the next flee buffer list in the list of free buffer lists is always null. So the packet processor may just check the next free buffer list pointer and only generate an interrupt when this pointer is null. Yet an additional method is to add to each buffer list in the linked list representation of the free buffer list a code. For example, a data word 70 (in FIG. 6), representing an element in the linked list of buffer lists, includes a pointer to the memory location storing the memory location of the next free buffer, as indicated at 72. Additionally, a pointer is provided to the address location storing the next buffer list, at 74. An interrupt code 76 may then be provided for the current buffer list. This interrupt code is evaluated by the packet processor which determines whether to generate an interrupt to generate another free buffer list. Thus, the local or host processor may be generating more free buffer lists while the network interface processes incoming packets. By suitably setting the interrupt code in the head of each free buffer list, interrupts can be generated on loading every new free buffer list, when just loading specific free buffer lists, or when just loading the last free buffer list. This interrupt code allows an application to determine how many free buffers and free buffer lists have been used so far and how many free buffers and free buffer lists remain. It also allows processing to be done upon the loading of a particular set of free buffers. Finally, the data word 70 may likely include an unused portion 78.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art. For example, the external buffer list may be a list and the packet processor may include a programmable register which indicates a number of buffers to be read from the external buffer list. These and other modifications are contemplated as falling within the scope of the invention as defined by the appended claims.

What is claimed is:

1. A computer system having a network interface for processing messages for applications executed on the computer system, wherein a message comprises a plurality of packets containing data and header information indicating a channel, the computer system comprising:

a buffer list memory for storing, for each application, an indicator of each free buffer available in memory allocated to the application, wherein the indicators are stored as a two-dimensional list of lists for each application, wherein a length of each of the lists in the two-dimensional list of lists corresponds to an anticipated size of an incoming message for the application; and a packet processor, in the network interface, having an input for receiving packets of incoming messages and including:

means, operative upon receipt of a message, for accessing the buffer list memory to retrieve one of the lists of the indicators of free buffers from the two-dimensional list for the application indicated by the header information of the packets of the message, and for storing the retrieved indicators in an internal memory, means, operative upon receipt of a packet of the message, for identifying a buffer to be used from the retrieved buffer list, and means for transferring the data in the packet to the identified buffer; and whereby an application can specify where each message received for the application starts in the memory allocated for the application.

2. The computer system of claim 1, wherein a processor able to access the packet processor pre-charges one of the lists in the list of lists with indicators of with specific buffer locations according to data deposit locations desired by an application, whereby the processor controls where data is deposited.

3. The computer system of claim 1, wherein each list of indicators of free buffers includes an indicator of the location in the buffer list memory of a next list of buffers.

4. The computer system of claim 1, further comprising:
an interrupt code in the buffer list memory and associated with the indicators of free buffers, and
wherein the packet processor includes means for reading and evaluating the interrupt code and for generating an interrupt indicating that more buffer lists are needed.

5. The computer system of claim 4, wherein a processor able to access the packet processor is responsive to the interrupt to identify additional free buffers and to modify the two-dimensional list of lists to include indicators of the additional free buffers.

6. The computer system of claim 5, wherein an application program running on the processor is responsive to the interrupt to generate more indications of free buffers.

7. The computer system of claim 4, wherein each list of indications of free buffers includes an interrupt code.

8. The computer system of claim 1, further comprising:
an interrupt code in the buffer list memory and associated with the indicators of free buffers, and
wherein the packet processor includes means, for reading and evaluating to the interrupt code and for generating an interrupt indicating that more buffer lists are needed.

9. The computer system of claim 8, wherein an operating system is responsive to the interrupt to identify additional free buffers.

10. The computer system of claim 8, wherein an application program is responsive to the interrupt to identify additional free buffers.

11. The computer system of claim 1, wherein the packet processor is connected to receive packets from an asynchronous transfer mode network.

12. The computer system of claim 1, further comprising means, in the packet processor and operative when the identified buffer is used and data remains in the packet, for identifying another buffer in the retrieved list and for continuing transfer of data from the packet to the other buffer.

13. The computer system of claim 1, further comprising means, in the packet processor and operative when a packet is received, for ensuring that indicators of free buffers are available.

14. The computer system of claim 13, wherein the means for ensuring includes means for generating an interrupt to an application, to request that a free buffer list be provided.

15. The computer system of claim 1, wherein the means for retrieving a list of the indicators of free buffers includes means for retrieving an indication of a next list of the indicators of free buffers.

16. The computer system of claim 15, wherein, when there is no indication of the next list, the means for retrieving an indication of the next list generates an interrupt to a processor able to access the packet processor to request that more free buffers be identified and that indicators of the free buffers be stored in the buffer list memory.

17. A network interface for processing messages comprising packets containing data and header information indicating an application, comprising:

a packet processor including an internal buffer list memory for storing indicators of free buffers for storing information from messages received for an application;

an external buffer list memory for storing a two-dimensional list of lists, for each application, of indications of free buffers in memory allocated to the application, wherein a length of each of the lists in the two-dimensional list of lists corresponds to an anticipated size of an incoming message for the application; and in the packet processor, means for accessing one of the lists in the two-dimensional list of indications of free buffers for the application indicated in the header information of the packets from the external buffer list memory and for copying the indicators into the internal buffer list of the packet processor; and whereby an application can specify where each message received for the application starts in the memory allocated for the application.

18. A method for processing messages by a network interface, wherein a message includes packets including data and header information indicating an application, comprising the steps of:

storing in a first memory a plurality of indicators of free buffers in application memory for each application in a two-dimensional list of lists of indications, wherein a length of each of the lists in the two-dimensional list of lists corresponds to an anticipated size of an incoming message for the application;

receiving a packet of a message;

identifying an application for the message from the header information of a packet;

retrieving one of the lists of indications of free buffers from the two-dimensional list in memory for the identified application and storing the retrieved list in a second memory;

selecting a buffer to be used from the retrieved indications in the second memory; and storing data from the packet into the selected buffer; and whereby an application can specify where each message received for the application starts in the memory allocated for the application.

19. A computer system for processing messages directed to applications and including a packet containing data and header information indicating an application, comprising:

a buffer list memory for storing, for each channel, indicators of free buffers available in memory allocated for the application, wherein the indicators of free buffers stored in the buffer list memory, for each application, are organized as a list of lists of indicators of free buffers, wherein the length of each list corresponds to an anticipated size of incoming message for the application; and a packet processor having an input for receiving packets of the message and including means, operative upon receipt of the message, for accessing the buffer list memory to retrieve one of the lists of indicators of free buffers for the application indicated by the packet and for storing the retrieved indicators in an internal memory, means, operative upon receipt of the packet, for identifying a buffer to be used from the retrieved buffer list by selecting one of the retrieved indicators stored in the internal memory, and means for transferring the data in the packet to the identified buffer; and whereby an application can specify where each message received for the application starts in the memory allocated for the application.

20. A network interface for processing messages containing packets including data and header information indicating an application, comprising:

a buffer list memory for storing, for each application, indicators of free buffers available in memory allocated for the application, wherein the indicators are stored as a two-dimensional list of lists including an interrupt code associated with the indicators of free buffers, wherein the length of each list corresponds to an anticipated size of an incoming message for the application; and a packet processor having an input for receiving the packet and including means, operative upon receipt of the packet, for accessing the buffer list memory to retrieve one of the lists of the indicators of free buffers from the two-dimensional list for the application indicated by the header information in packets of the message and for storing the retrieved indicators in an internal memory, means for reading and evaluating the interrupt code and for generating an interrupt indicating that more lists of indicators of free buffers are needed, means, operative upon receipt of the packet, for identifying a buffer to be used from the retrieved list, and means for transferring the data in the packet to the identified buffer; and whereby an application can specify where each message received for the application starts in the memory allocated for the application.

* * * * *